United States Patent [19]

Boattini et al.

[11] Patent Number: 5,364,479
[45] Date of Patent: Nov. 15, 1994

[54] PROCESS FOR THE MANUFACTURE OF DECORATED SHEETS OF LAMINATED SAFETY GLASS

[75] Inventors: Pier P. Boattini, Vasto; Carlo D'Angio', Monteodorisio; Ciro Paudice, Vasto, all of Italy

[73] Assignee: Societe Italiana Vetro-SIV-S.p.A., San Salvo CH, Italy

[21] Appl. No.: 60,515

[22] Filed: May 12, 1993

Related U.S. Application Data

[63] Continuation of Ser. No. 774,231, Oct. 10, 1991, abandoned.

[30] Foreign Application Priority Data

Oct. 11, 1990 [IT] Italy .................. 48354-A/90

[51] Int. Cl.$^5$ ............................. B32B 17/10
[52] U.S. Cl. .................. 156/100; 156/106; 156/235; 156/240; 156/277
[58] Field of Search ......... 156/99, 100, 230, 235, 156/238, 239, 240, 277, 106; 428/38, 40

[56] References Cited

U.S. PATENT DOCUMENTS 4,173,672 11/1979 Mannheim .................. 156/100
4,935,300 6/1990 Parker et al. ................ 156/240
4,976,805 12/1990 Ishii et al. .................... 156/100

Primary Examiner—Jeff H. Aftergut
Attorney, Agent, or Firm—Wenderoth, Lind & Ponack

[57] ABSTRACT

Decorated sheets of laminated safety glass, particularly for use in the field of building construction and vehicles for transportation, are manufactured using a process which makes it possible to obtain a product which can be defined as laminated safety glass. The process consists in reproducing the decoration on a support formed by paper and polyethylene layers and transferring said decoration onto the interposed plastic film, using the adhesive bond differential between decoration and polyethylene and decoration and plastic film.

3 Claims, No Drawings

PROCESS FOR THE MANUFACTURE OF DECORATED SHEETS OF LAMINATED SAFETY GLASS

This application is a continuation of now abandoned application Ser. No. 07/774,231, filed Oct. 10, 1991.

BACKGROUND OF THE INVENTION

1. Field of the Invention

The present invention refers to a process for the manufacture of decorated-sheets of laminated safety glass which can be used to advantage in the field of building construction and manufacturing.

Present conventional decorated sheets of glass are products having a wide range of colours, as well as the possibility of reproducing complicated decorations, for example with the use of shading.

On the other hand, the more and more widespread use of this glass and the ever greater variety of fields in which the glass is used mean that, as well as requirements of an aesthetic nature, the glass also has to meet safety requirements, in particular in the case of their use as windows for vehicles and/or for building construction.

2. Description of the Prior Art

From the state of the art is known, and described in French utility certificate FR-2639631-B3, a safety product in glass for building, formed by two sheets of glass and by a layer of plastic inserted therebetween, said plastic layer being preferably polyvinylbutyral (PVB), in which a design or decoration is applied on the layer of PVB, by means of transfer techniques.

The definition of laminated safety glass is given to a product, made up of two or more layers of glass, held together by a plastic material capable of resisting the impact of a soft body.

UNI standard 7142 states that the impact must be that of a sack weighing 45 Kg dropped from a height of 45 cm or from a height of 120 cm.

If the laminate resists said impact, it can be defined a safety product, belonging to class A if the weight fell from 45 cm, to class B if it fell from 120 cm.

Another standard commonly used to define a laminated safety product is the boiling test described by ANSI standard 297.1.1975, which requires that a sample of laminated glass be boiled in water for two hours, showing, at the end of said period, no bubbles or other defects at a distance greater than half an inch from the outer edge or from any break which may have occurred during the test itself.

The decorated sheets of laminated glass manufactured using the process according to the present invention are also sheets of safety glass, as they pass both the tests described above.

The process is furthermore aimed at reducing to a minimum the working phases, so as to perform a reduction of production costs.

The prior art teaches how to print a decoration on a substrate. In the present description a decoration is defined as a drawing of whatever form, colour, size and complexity, having the function of an ornament or having a utility function.

A known printing process consists, for example, in first reproducing the decoration to be transferred on paper, and then in pressing said paper, under suitable temperature and pressure conditions, onto the substrate to be decorated, by means of a calender.

To allow the decoration to be transferred easily from the paper to the substrate, the temperature is generally between 160° and 220° C., so as to permit the dyes to penetrate into the substrate by sublimation.

The two continuous sheets of paper and substrate, once the calendering and transfer have been carried out, divide and are each rolled up separately.

From the state of the art is also known the process for lamination of two sheets of glass.

Said process consists in forming an assembly made up of two sheets of glass between which is inserted a film of plastic material, preferably polyvinylbutyral (PVB). This assembly then undergoes a number of pressing cycles at suitable temperatures and pressures, so as to finally seal the two sheets of glass. It is known that, in the manufacture of laminated sheets of glass, one of the hardest technical problems to solve is that of air bubbles, which are trapped inside the assembly during pressing and which are the cause of rejection or unsticking as the product ages.

This problem was solved in the prior art by roughening the surfaces of the interposed plastic (polyvinylbutyral), thus permitting the air bubbles to escape during the first of the pressing cycles, so that the adhesiveness between the interposed layer and the sheets of glass is not reduced and the product passes the boiling and shattering tests described above.

In the case of decorations of varying kinds being applied by transfer onto the surface of the PVB surface, the temperatures and pressures used, described in the known printing processes, destroy the roughness found on the surface, thus preventing an efficient removal of air bubbles from the laminate during its manufacture.

It has thus been necessary to find particular types of ink and particular types of support on which to place the decorations so that, at the moment of transfer, the alteration in the surface of the PVB is avoided.

SUMMARY OF THE INVENTION

It has now been discovered that the film of plastic material, in this case polyvinylbutyral, can be easily decorated, without for this reason damaging the physical characteristics of its surfaces, by means of a process for transfer of the decoration onto the PVB which makes sole use of the adhesive capacity of the PVB itself to said decoration.

In particular a new support for the decoration has been found, formed by a substrate of a cellulose layer, such as paper, covered by a second layer of polyethylene. The layer of polyethylene is deposited on the paper and joined thereto using known methods. The decoration is made using inks comprising polyvinylbutyral and organic pigments deposited directly onto the layer of polyethylene.

In this way the cellulose layer (paper) has the function of making the system rigid and thus of preventing any deformation of the decoration, while the polyethylene has a releasing function.

In fact, when the strip of support is put into contact, in a calender, with the strip of PVB, the decoration easily transfers onto the PVB, as the adhesion of the decoration to the polyethylene is less than that of the decoration to the PVB.

In this case the action of a high temperature is no longer of importance and thus it is no longer necessary to exceed a temperature of 60° C. during the transfer phase of the decoration onto the strip of PVB. Furthermore, only a pressure sufficient to keep the two strips together is necessary.

In other words the transfer of the decoration onto the PVB is carried out merely by taking advantage of the different adhesive capacities existing between the polyethylene ink and ink PVB interfaces, and the decoration is transferred onto the PVB as if it were a film of PVB sticking to another film of PVB.

An object of the present invention is therefore a process for the manufacture of decorated sheets of laminated safety glass, of the kind including the steps of decorating a film of plastic material, an assembly consisting of two sheets of glass having the plastic film interposed between them, and laminating the assembly, comprising the following operations:
  a) preparation of a support by depositing on a substrate of cellulose paper and joining thereto a layer of polyethylene,
  b) making a decoration on the layer of polyethylene,
  c) transferring said decoration from the layer of polyethylene onto the film of plastic to be interposed,
  d) forming a glass/decorated film/glass assembly,
  e) laminating the assembly thus obtained, the transfer of the decoration onto the PVB film taking place because the bond between polyethylene and decoration is less strong than that between decoration and PVB.

The advantage of the process according to the present invention resides in the fact that the PVB can be used immediately after transfer of the decoration, and has no need of successive treatments, such as, for example, washing before being inserted as an interposed layer between two sheets of glass to be laminated.

DESCRIPTION OF THE PREFERRED EMBODIMENT

The peculiar features of the invention will be more clearly seen on consideration of a preferred embodiment of the process, as hereinbelow described.

A roll of tape of polyvinylbutyral film is loaded onto a feed roller of a printing machine which uses the transfer method. A roll of tape of decorated support is loaded onto another feed roller in the same transfer machine.

The decorated support has been made using as a substrate a strip of paper weighing between 40 and 60 grams per square meter and depositing on the paper substrate a layer of polyethylene having a uniform thickness and a weight of approximately 20-25 grams per square meter. The two layers were then joined using known methods. On the polyethylene layer decorations were made using inks based on polyvinylbutyral and inorganic pigments.

The two tapes, PVB and decorated support respectively, pass around a heated transfer calender and are kept one against the other by means of a strip of felt wrapped around the assembly of support, PVB and calender.

The calender heats the PVB to a temperature equivalent to approximately 60° C., sufficient to allow rapid transfer of the decoration from the support to the PVB.

Following this, the support and the PVB separate and the support is wound up again, while the PVB is cooled, cut into sheets and transferred to the production line for manufacture of laminated sheets of glass, where it will be inserted between the pairs of sheets of glass.

The assembly formed by the two sheets of glass with the decorated PVB film interposed therebetween is then hot-pressed one or more times, to deaerate the system, and then treated in an autoclave to finally seal the whole assembly.

Shattering and boiling tests performed upon by the samples of decorated laminated glass obtained according to the process described were all passed successfully, thus also allowing the product to be defined a safety product.

Although the invention has been described with reference to a preferred embodiment thereof, it is to be understood that the invention is not limited to this precise embodiment and that changes may be made therein without departing from the scope of the invention.

We claim:

1. A process for the manufacture of decorated sheets of laminated safety glass by decorating a polyvinylbutyral film having a roughened surface by transferring the decoration onto said polyvinylbutyral film making sole use of the adhesive capacity of said polyvinylbutyral film to said decoration, forming an assembly consisting of two sheets of glass having said decorated polyvinylbutyral film interposed between them, and laminating said assembly, consisting essentially of the steps of:
  a) preparing a support consisting of a substrate of cellulose paper and a layer of polyethylene joined thereto,
  b) depositing on said layer of polyethylene a decoration made of inks based on polyvinylbutyral and inorganic pigments,
  c) transferring said decoration from the layer of polyethylene onto the polyvinylbutyral film in a heat transfer calendar at a temperature not exceeding 60° C. to prevent destruction of the roughened surface of said polyvinylbutyral film and under a pressure only sufficient to keep said layer and said film together,
  d) immediately, without any successive treatments, forming a glass/decorated film/glass assembly by interposing the decorated polyvinylbutyral film between two sheets of glass, and
  e) laminating the assembly thus obtained.

2. A process as set forth in claim 1, in which the transfer of the decoration onto the polyvinylbutyral film is carried out using a decoration and a polyvinylbutyral film, which transfer occurs because the bond between the decoration and the polyvinylbutyral film is stronger than the bond between the decoration and polyethylene.

3. A process as set forth in claim 1, in which the layer of polyethylene deposited on the cellulose paper substrate has a weight not higher than 25 grams per square meter.

* * * * *